United States Patent Office 3,327,269
Patented June 20, 1967

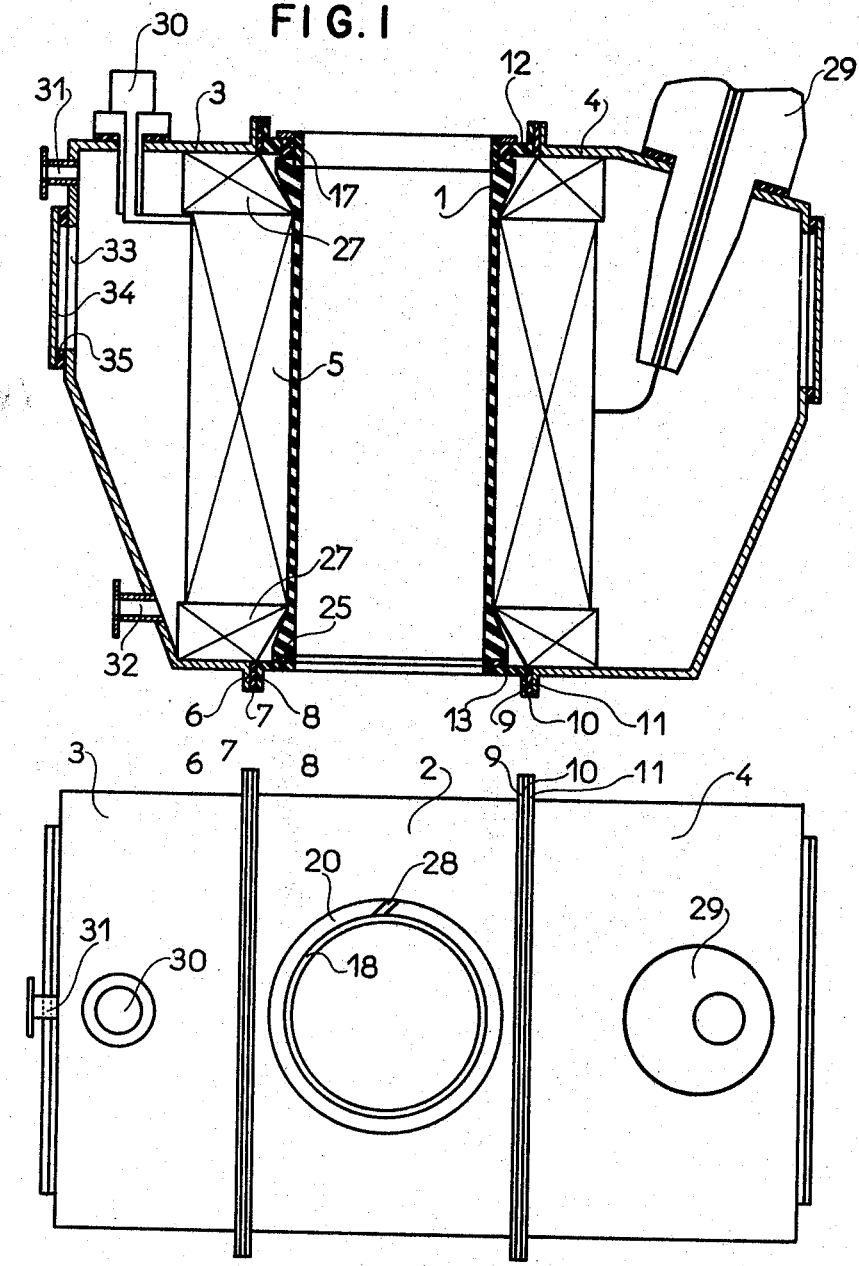

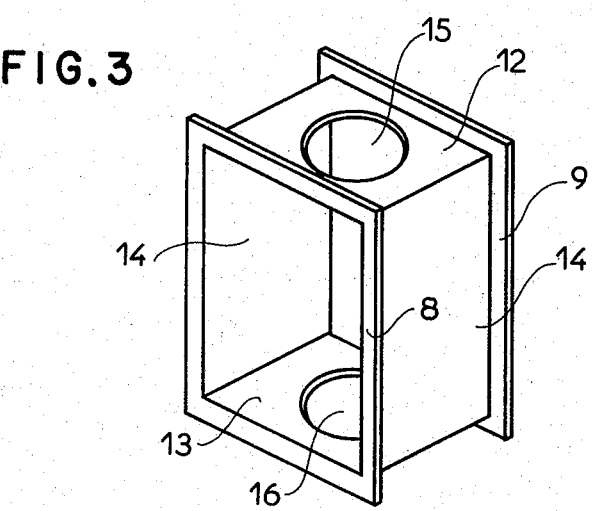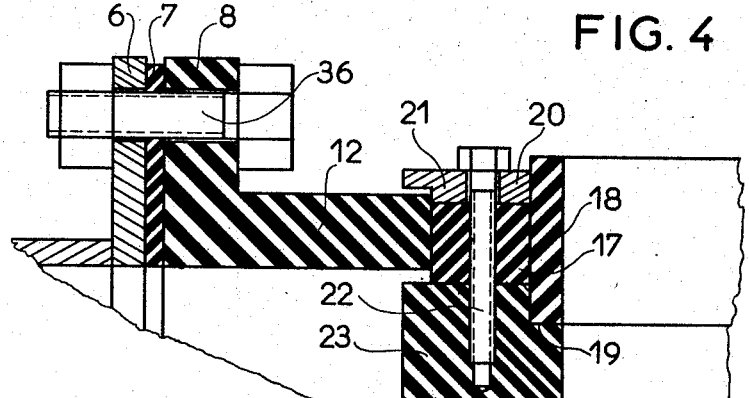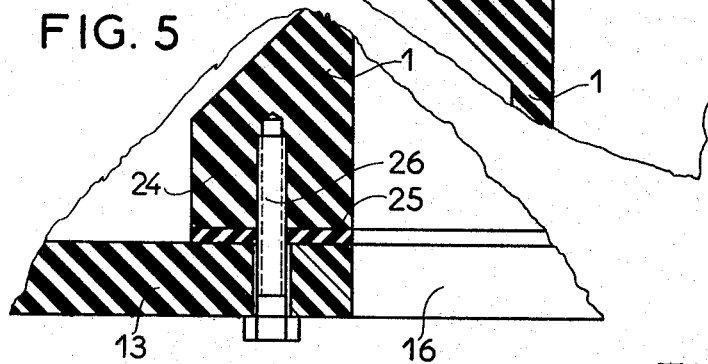

3,327,269
POLYPHASE TRANSFORMER WITH INDEPENDENTLY SHIELDED COILS
Pierre Vincent-Martin, 17 Rue du Temple,
Aix-les-Bains, France
Filed July 30, 1965, Ser. No. 476,087
12 Claims. (Cl. 336—92)

The present invention relates in general to static electrical devices comprising inductive windings, such as transformers or feed-back windings and more particularly to independently transportable assemblies or members which may be easily and efficiently assembled into the desired completed device at the utilization site.

In static electric devices of the type described where the tank-cell is formed by a metal thimble joint, it is necessary to secure a lid and a bottom on the thimble joint flanges with interposition of fluid-tight joints therebetween. However, this thimble joint does not constitute a closed turn since it must be interrupted by a lengthwise slot within there is intercalated a third fluid-tight joint between the thimble joint flanges.

This third joint is located in a plane perpendicular to the first two joints and its ends, along the whole length of the slot, must be in firm contact with the two other joints by means of a pressure sufficient to ensure the leaktightness of the joint.

The joints in these known devices are flexible but not sensibly compressible and it is to be noted that, after a deformation of the longitudinal joint due to a settling or to a shrinkage of the joint, this latter joint no longer firmly contacts the other two joints along the whole length and breadth of the thimble joint slot. This results in a lack of tightness which becomes very difficult to eliminate.

The present invention has for its object static electrical devices comprising at least one inductive coil constituting together with a tankcell a removable unitary assembly capable of being independently transported and connected into the magnetic circuit of the device on the utilization site.

Another object of the invention is to give such a tank-cell a sufficient mechanical strength to withstand the forces which are transmitted between the coil and the tank, more particularly the electrodynamic forces which may be particularly strong.

Another object of the invention is to allow an easy dismantling of this tank-cell in order to provide easy access to the coil.

The invention has specifically for its object to render such a tank-cell fluid-tight and to provide physical separation between two fluid-tight joints located in different planes of the assembled device.

These and other objects, features and advantages of the present invention will become more obvious from the following description when taken in connection with the accompanying drawing which shows, for purposes of illustration only, one embodiment in accordance with the present invention, and wherein FIGURE 1 is a sectional view of a tank-cell according to one exemplary embodiment of the invention;

FIGURE 2 is a top view of the tank-cell of FIGURE 1;

FIGURE 3 is a perspective view of the insulating frame of the tank-cell of the FIGURES 1 and 2;

FIGURE 4 is an enlarged longitudinal sectional view of a detail of FIGURE 1 showing the way the upper end of the duct, through which passes the winding magnetic core, is tightly fixed;

FIGURE 5 is an enlarged longitudinal section view of a detail of FIGURE 1 showing the tight fixing mode of the same duct lower end.

The tank-cell described and illustrated by way of example is essentially constituted of a frame 2 made of insulating material, illustrated separately in FIGURE 3, and two shells 3 and 4 made of steel sheet and placed on each side of the insulating frame 2, as shown in FIGURES 1 and 2.

This frame 2 has a rectangular shape, and is intended to house the winding shown at 5 on FIGURE 1. It has two vertical sides 14 and two horizontal sides 12 and 13 which are perpendicular to the axis of the winding 5 and are provided with central circular openings 15 and 16 which support the magnetic core for the winding 5. The four sides of the frame 2 have the same dimensions and the frame is provided with peripheral rims 8 and 9 located on either side thereof lying in a plane perpendicular to the frame sides.

The two steel shells 3 and 4 each have one completely open side corresponding in dimension to the open sides of the frame 2, which open sides of the shells are also provided with flanges or rims 6 and 11, corresponding to the rims 8 and 9 which are pressed on the frame flanges or rims 8 and 9 with the joints 7 and 10 interposed therebetween by means of locking bolts 36, shown on the detailed view in FIGURE 4. The flat joints 7 and 10 may beneficially have a circular or annular configuration and are constructed so that the pressing of these joints between two plane surfaces of the rims makes it possible to produce a uniform distribution of the locking compression and the tightness of such joints between plane surfaces is assured.

However, the continuous surface of the frame flanges and of the shell rims could be provided as a curved surface in order that the frame sides 12 and 13 will be broader in their middle, in front of the openings 15 and 16, than at their ends. Nevertheless these surfaces must allow a sufficient distribution of the locking pressure on the joints even after a locking modification.

Furthermore, according to a variation of the invention, the flanges along the frame vertical sides 14 could be other than outwardly directed as illustrated, but may also be inwardly directed in order to decrease the overal lateral dimensions of the tank.

The insulating frame 2 may be made of a resin of the epoxy, polyester, silicone or bakelite type or of loaded rubber. It may be produced as a unitary molded element with or without pressure. It may be reinforced by glass fiber or any other material providing good properties of electrical insulation while increasing the overall mechanical strength thereof. This reinforcing framework increasing the mechanical strength of the frame could also be metallic, however, provided that it does not constitute closed turns in the form of loop-like electrical paths. It is also possible to build this frame 5 by winding on a mandrel a tape preimpregnated with nonpolymerized setting resin saving the openings 15 and 16 and forming the flanges 8 and 9, then polymerzing the impregnated resin to form the rigid frame.

It can be useful more particularly in the case of a large dimension frame to form the elements beforehand, joining them tightly afterwards by any known process such as two phase polymerization, mortise assembling, herring-bone, dovetail, etc. The final tightness may be moreover reinforced by impregnation after assembling.

An insulating tube 1 passes through the tank-cell from one side to the other and is supported within the openings 15 and 16 where the tube is tightly fixed to the frame sides 12 and 13.

This insulating tube 1 is mainly used to provide within the axis of the winding an empty space where the winding core will be placed after the mounting of the tank-cell in the magnetic circuit of the device.

The length of the tube 1 is preferably smaller than the free distance between the frame faces 12 and 13. This makes it possible to mount the tube 1 inside the winding 5 before the positioning of this latter inside the insulating frame.

According to a recommended feature of the invention, the tube 1 is used as a mandrel to bear the winding during the making of the winding and thereby the positioning of the winding in the frame 2 is greatly facilitated.

The outer diameter of tube 1 is larger toward its ends in order to produce wedge-shaped portions 23 and 24 in its wall making it possible to achieve a tight contact with the frame openings 15 and 16. The tube 1 rests by its lower end on the frame side 13 with interposition of a fluid tight joint 25, shown in FIGURE 5. The securing of the tube to the frame and the tightness of this conection are obtained by means of the locking screws 26 which pass through the frame side 13 and the joint 25 and are screwed at intervals into the wedge-shaped portion 24 of the tube 1.

Tube 1 is provided at its upper end with the inner annular wedge-shaped portion 23 having a shoulder 19 for supporting the lower part of a cylindrical ring 18, having the same inner diameter as the tube 1. The ring 18 is set in this shoulder at a height sufficient to pass through the opening 15 on the upper horizontal side 12 of the insulating frame. The diameter of the circular opening 15 is large enough to provide a free annular space between its edge and the ring 18 in which is placed a flexible tightness joint 17 of rectangular section.

A metallic annular locking element 20 rests on the joint 17 upper face. Locking screws 22 pass through the annular element 20 as well as through the joint 17 and are screwed in the wedge-shaped portion 23 of tube 1, at intervals, in order to compress the joint 17, pressing it on the upper front face of tube 1, on the inner face of the frame opening 15 and on the outer face of the cylindrical ring 18. In this way, there is achieved a tight fixation of tube 1, which is moreover adjustable in height since the cylindrical ring can axially slide inside the joint 17 and the tube 1. The tightness will not be affected by the distortions or expansions due for instance to over-pressure or temperature changes.

The metallic annular locking element 20 must not constitute a closed turn. It comprises for this purpose a slot 28, which as is shown on FIGURE 2, is obliquely made in order to better distribute the pressure it must exert on the joint 17. Furthermore, the annular element 20 comprises a shouldering 21. This element 20 has been represented for the sake of the drawing clearness on FIGURE 4 before the locking of joint 17 but this joint 17 has such dimensions that the shouldering 21 comes in contact with the insulating frame side 12 when completely locked. This makes it possible to stabilize the position of annular element 20 and avoids any undesirable sliding of the joint 17 and "wetting" of the latter due to inner over-pressure in the oil of the tank.

It is to be noted that the breadth of the insulating frame sides can only be a little higher than the outer diameter of the insulating tube 1 on which is mounted the winding 5 so that this latter will broadly protrude inside the shells 3 and 4.

The elements locking and wedging the winding 5 have been only schematically represented at 27 (FIGURE 1) at each end of the winding without the pulling rods applying the locking elements on the winding front face. This representation, however, more clearly illustrates that the wedging elements do only rest on the steel shells 3 and 4.

The high and low voltage bushings are also mounted on the steel shells, as has been schematically indicated, by way of example, at 29 and 30. The oil input and output pipings have been equally mounted on the steel shells as shown at 31 and 32. A piping for gas detector relay of the Buchholz type can be identically mounted at the upper part of one of the steel shells.

The on load regulation devices and the accessory elements such as the reactance coils of the Petersen type, can be enclosed within the shells. These various devices and accessory elements located inside the shells can be made accessible by overhauling removable doors 33 mounted before the openings 34 by means of a tightness joint 35. Since these units have a relatively small size, the cooling devices can be built in and made integral with one or the other of the shells of the tank. A unitary set such as the one herein described can be built beforehand, separately handled, and eventually stocked.

The windings of the different phases of a multiphase transformer can each be mounted in a tank-cell such as described and be independently transported, each in a distinct parcel in order to be afterwards mounted around the various cores of the transformer magnetic circuit on the utilization site.

The tank-cell of any phase may moreover be later disassociated with its winding from the circuit in case of damage, and be replaced by an identical tank-cell with another winding.

While I have shown and described one embodiment in accordance with the present invention, it is understood the same is not limited thereto but is susceptible of many changes and modifications within the spirit and scope of the present invention.

I claim:
1. In a stationary electrical device, for supporting an inductive coil, in which said coil is mounted on a magnetic circuit and is immersed in an insulating fluid inside a tank-cell, said tank cell being constructed in combination with said coil so as to form a removable unitary set, independently transportable from the device magnetic circuit, said tank cell comprising:
   an inductive coil having a central axis,
   a frame made of an insulating material surrounding the coil and having at least two closed sides which are approximately perpendicular to the coil axis, and two open sides, each closed side including an opening;
   a tubular duct made of an insulating material positioned within said frame with the ends thereof terminating adjacent said openings on the sides of said frame, said duct being tightly secured to the two sides of the frame, said inductive coil being mounted on said tubular duct; and
   a pair of shells located on either side of the frame having one open side providing flanges which are secured to corresponding flanges on said open frame sides.

2. A stationary electrical device according to claim 1, in which each of said shells being provided along its said edges, with a flange, bears, by medium of a fluid-tight joint, on flanges of the said open frame sides along a continuous surface.

3. A stationary electrical device according to claim 1, in which each of the said shells being provided along its said edges with a flange, bears, by medium of a fluid-tight joint, on flanges of the said open frame sides along a plane surface.

4. A stationary electrical device according to claim 1, in which each of the said shells being provided along its said edges, with a flange, bears on flanges of the said frame sides, along a curved surface so determined that the said upper and lower sides of the frame are broader in the middle than at their ends, making it possible to keep an approximately equal distribution of the bearing pressure on said flanges even after a modification of the joint locking.

5. A stationary electrical device according to claim 1, in which the said coil is secured to the said tubular duct, and in which the said duct has a shorter length than the free distance between the two closed frame sides approximately perpendicular to the coil axis, the duct ends being secured to the frame by means of fluid-tight fixing devices, at least one of which is axially adjustable.

6. A stationary electrical device according to claim 5, in which the said tubular duct comprises at one of its ends a frontal surface secured on one of said closed frame sides by way of a fluid-tight joint locked by locking means, screwed into the wall of the tubular duct through the said frame closed side, and axially adjustable fluid-tight fixing means for locking said tubular duct by its other end to the opposed frame side.

7. A stationary electrical device according to claim 6, in which the said axially adjustable fluid-tight fixing means, locking one of the said tubular duct ends comprises:
- an annular housing member provided on one of the tubular duct ends and having an annular shouldering thereon;
- an annular ring mounted in the annular shouldering of said annular housing and passing through the said opening on the corresponding closed side of the said insulating frame;
- an annular flexible joint located between the said annular ring and the said opening edge on the frame side;
- an annular element applied against the said flexible annular joint so as to press it onto said annular housing member on the end of the insulating tubular duct; and
- locking means screwed in the wall of the insulating tubular duct, through the said flexible annular joint and the said annular element.

8. A stationary electrical device according to claim 1, in which the two shells are made of steel sheet, and lead through connectors mounted on these steel sheet shells for connection to said coil.

9. In a stationary electrical device for supporting an inductive coil, in which said coil is mounted on a magnetic circuit and is immersed in an insulating fluid inside a tank-cell, said tank cell being constructed in combination with said coil so as to form a removable unitary set, independently transportable from the device magnetic circuit, said tank-cell set comprising;
- an inductive coil,
- a box-shaped frame made of insulating material having two open sides framed by transversely extending rims, two oppositely disposed closed sides of said frame being provided with concentric apertures,
- a tubular duct of insulating material positioned within said frame with the ends thereof terminating adjacent said apertures, said duct being of shorter length than the free distance between the sides of said frame containing said apertures, said inductive coil being mounted on said tubular duct, and
- securing means for securing said duct at the ends thereof to said frame including an axially adjustable fluid-tight securing device.

10. In a stationary electrical device for supporting an inductive coil, in which said coil is mounted on a magnetic circuit and is immersed in an insulating fluid inside a tank cell, said tank cell being constructed in combination with said coil so as to form a removable unitary set, independently transportable from the device magnetic circuit, said tank cell set comprising
- an inductive coil,
- a box-shaped frame made of insulating material having two open sides framed by transversely extending rims, two oppositely disposed closed sides of said frame being provided with concentric apertures,
- a tubular duct of insulating material positioned within said frame with the ends thereof terminating adjacent said apertures, said duct being of shorter length than the free distance between the sides of said frame containing said apertures, said inductive coil being mounted on said tubular duct, and
- securing means for securing said duct at the ends thereof to said frame including an axially adjustable fluid-tight securing device,
- a pair of shells located on either side of said frame having one open side providing flanges which are tightly secured to the rims on said frame so as to form a fluid tight joint therebetween.

11. In a stationary electrical device for supporting an inductive coil, in which said coil is mounted on a magnetic circuit and is immersed in an insulating fluid inside a tank cell, said tank cell being constructed in combination with said coil so as to form a removable unitary set, independently transportable from the device magnetic circuit, said tank cell set comprising
- an inductive coil,
- a box-shaped frame made of insulating material having two open sides framed by transversely extending rims, two oppositely disposed closed sides of said frame being provided with concentric apertures,
- a tubular duct of insulating material positioned within said frame with the ends thereof terminating adjacent said apertures, said duct being of shorter length than the free distance between the sides of said frame containing said apertures said inductive coil being mounted on said tubular duct, and
- securing means for securing said duct at the ends thereof to said frame including an axially adjustable fluid-tight securing device, in which the axially adjustable fluid tight fixing means includes
- an annular wedge shaped member provided on at least one of the tubular duct ends and having an annular shoulder thereon facing said aperture,
- an annular ring mounted in the annular shoulder of said annular wedge shaped member and passing through the said aperture on the corresponding side of said insulating frame,
- an annular flexible joint located between the said annular ring and the said opening edge on the frame side,
- an annular element applied against the said flexible annular joint so as to press it onto said annular wedge shaped member on the end of the insulating tubular duct; and
- locking means screwed in the wall of the insulating tubular duct, through the said flexible annular joint and the said annular element.

12. In a stationary electrical device for supporting an inductive coil, in which said coil is mounted on a magnetic circuit and is immersed in an insulating fluid inside a tank cell, said tank cell being constructed in combination with said coil so as to form a removable unitary set, independently transportable from the device magnetic circuit, said tank cell set comprising;
- an inductive coil,
- a box-shaped frame made of insulating material having two open sides framed by transversely extending rims, two oppositely disposed closed sides of said frame being provided with concentric apertures,
- a tubular duct of insulating material positioned within said frame with the ends thereof terminating adjacent said apertures, said duct being of shorter length than the free distance between the sides of said frame containing said apertures, said inductive coil being mounted on said tubular duct, and
- securing means for securing said duct at the ends thereof to said frame including an axially adjustable fluid-tight securing device,
- said tubular duct comprises at one of its ends a frontal surface secured on one of said frame sides by way of a fluid-tight joint secured by locking means screwed into the wall of the tubular duct through the said frame side.

References Cited
UNITED STATES PATENTS

| | | | |
|---|---|---|---|
| 2,340,727 | 2/1944 | Zeh | 336—68 X |
| 2,483,801 | 10/1949 | Beewar | 336—92 X |
| 2,544,508 | 3/1951 | Mackey | 336—92 |
| 3,208,019 | 9/1965 | Stigant et al. | 336—58 |
| 3,235,823 | 2/1966 | Renberg | 336—92 X |

LEWIS H. MYERS, *Primary Examiner.*

T. J. KOZMA, *Assistant Examiner.*